US012614093B2

(12) United States Patent
Yaguchi et al.

(10) Patent No.: US 12,614,093 B2
(45) Date of Patent: Apr. 28, 2026

(54) INFERENCE APPARATUS, LEARNING APPARATUS, INFERENCE METHOD, AND LEARNING METHOD

(71) Applicant: KABUSHIKI KAISHA TOSHIBA, Minato-ku (JP)

(72) Inventors: Atsushi Yaguchi, Taito (JP); Akiyuki Tanizawa, Kawasaki (JP); Wataru Asano, Yokohama (JP); Shuhei Nitta, Ota (JP); Yukinobu Sakata, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 1371 days.

(21) Appl. No.: 16/803,376

(22) Filed: Feb. 27, 2020

(65) Prior Publication Data

US 2021/0012228 A1 Jan. 14, 2021

(30) Foreign Application Priority Data

Jul. 8, 2019 (JP) .................................. 2019-126591

(51) Int. Cl.
| | |
|---|---|
| *G06N 5/043* | (2023.01) |
| *G06F 11/34* | (2006.01) |
| *G06N 3/045* | (2023.01) |
| *G06N 20/00* | (2019.01) |

(52) U.S. Cl.
CPC ......... *G06N 5/043* (2013.01); *G06F 11/3466* (2013.01); *G06N 3/045* (2023.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,877,558 | B1 * | 12/2020 | Zhao | G06F 3/014 |
| 10,990,850 | B1 * | 4/2021 | Chen | G06N 20/00 |
| 10,997,500 | B1 * | 5/2021 | Vishnu Narayanan .. | G06N 5/04 |
| 11,210,624 | B1 * | 12/2021 | Wang | G06N 3/084 |

(Continued)

FOREIGN PATENT DOCUMENTS

WO WO 2018/016608 A1 1/2018

OTHER PUBLICATIONS

Jiahui Yu, et al., "Slimmable Neural Networks", arXiv:1812. 08928v1, Dec. 21, 2018, 12 pages.

(Continued)

*Primary Examiner* — Chirag G Shah
*Assistant Examiner* — Suk Jin Kang
(74) *Attorney, Agent, or Firm* — Oblon, McClelland, Maier & Neustadt, L.L.P.

(57) ABSTRACT

An inference apparatus according to an embodiment of the present disclosure includes a memory and a hardware processor coupled to the memory. The hardware processor is configured to: acquire at least one control parameter of second machine learning model, the second machine learning model having a size smaller than a size of a first machine learning model input to the inference apparatus; change the first machine learning model to the second machine learning model based on the at least one control parameter; and perform inference in response to input data by using the second machine learning model.

6 Claims, 10 Drawing Sheets

(56) References Cited

U.S. PATENT DOCUMENTS

| | | | | |
|---|---|---|---|---|
| 11,238,596 | B1* | 2/2022 | Gadde | G06T 7/11 |
| 11,694,110 | B2* | 7/2023 | Ganapavarapu | G06N 20/00 |
| | | | | 706/10 |
| 11,715,040 | B1* | 8/2023 | Matthews | H04L 49/3027 |
| | | | | 706/12 |
| 11,783,206 | B1* | 10/2023 | Makwana | G06N 20/10 |
| | | | | 706/12 |
| 11,847,567 | B1* | 12/2023 | Sather | G06N 3/0499 |
| 12,045,725 | B1* | 7/2024 | Sather | G06N 3/048 |
| 12,136,039 | B1* | 11/2024 | Sather | G06N 3/084 |
| 2014/0058991 | A1* | 2/2014 | Harik | G06N 20/00 |
| | | | | 706/14 |
| 2017/0161640 | A1* | 6/2017 | Shamir | G06N 20/00 |
| 2018/0129972 | A1* | 5/2018 | Chen | G06F 40/44 |
| 2018/0176576 | A1* | 6/2018 | Rippel | G06V 10/82 |
| 2018/0253401 | A1* | 9/2018 | Cardinaux | G06N 3/08 |
| 2019/0228304 | A1* | 7/2019 | Saito | G16C 20/90 |
| 2019/0318202 | A1* | 10/2019 | Zhao | G06F 18/214 |
| 2019/0325308 | A1* | 10/2019 | Chung | G06F 40/216 |
| 2019/0332644 | A1* | 10/2019 | Freed | G06F 40/143 |
| 2019/0332941 | A1* | 10/2019 | Towal | G06N 3/084 |
| 2019/0378011 | A1* | 12/2019 | Iwakura | G16H 10/60 |
| 2020/0082264 | A1* | 3/2020 | Guo | G06N 3/084 |
| 2020/0097921 | A1* | 3/2020 | Ghosh | G06N 3/08 |
| 2020/0118027 | A1* | 4/2020 | Kikuchi | G06N 20/00 |
| 2020/0193327 | A1* | 6/2020 | Iwakura | G06F 16/9024 |
| 2020/0219015 | A1* | 7/2020 | Lee | G06N 20/20 |
| 2020/0234144 | A1* | 7/2020 | Such | G06V 10/774 |
| 2020/0234196 | A1* | 7/2020 | Nishino | H04L 63/1425 |
| 2020/0311300 | A1* | 10/2020 | Callcut | G06N 20/00 |
| 2020/0311933 | A1* | 10/2020 | Semturs | G06N 3/04 |
| 2020/0320382 | A1* | 10/2020 | Burkhart | G06N 3/047 |
| 2020/0334535 | A1* | 10/2020 | Rippel | G06V 30/18057 |
| 2020/0356905 | A1* | 11/2020 | Luk | G06N 3/0454 |
| 2020/0394470 | A1* | 12/2020 | Ganapavarapu | G06F 18/2185 |
| 2020/0410396 | A1* | 12/2020 | Chen | G06N 20/00 |
| 2021/0142108 | A1* | 5/2021 | Huang | G06F 18/24143 |
| 2021/0232925 | A1* | 7/2021 | Olabiyi | G06N 3/08 |
| 2021/0248459 | A1* | 8/2021 | Li | G06N 3/0454 |
| 2022/0179625 | A1* | 6/2022 | Shi | G06F 16/24 |
| 2022/0283820 | A1* | 9/2022 | Pudipeddi | H04L 67/10 |
| 2022/0327686 | A1* | 10/2022 | Koopman | G06N 3/084 |
| 2023/0031156 | A1* | 2/2023 | Zhao | G06F 18/24323 |
| 2023/0037338 | A1* | 2/2023 | Wang | G16H 50/20 |
| 2023/0316076 | A1* | 10/2023 | Morris | G06Q 20/4093 |
| | | | | 706/15 |
| 2023/0325682 | A1* | 10/2023 | Callcut | G06F 30/20 |
| | | | | 706/45 |

OTHER PUBLICATIONS

Jiahui Yu, et al., "Universally Slimmable Networks and Improved Training Techniques", arXiv:1903.05134v2, Oct. 20, 2019, 11 pages.

* cited by examiner

NONUNIFORM

IMAGE → ACQUISITION DEVICE 30 → INFERENCE APPARATUS 10 → VEHICLE CONTROL DEVICE 40 →

CONTROL PARAMETER →

| CONTROL DEVICE 301 | MAIN STORAGE DEVICE 302 | AUXILIARY STORAGE DEVICE 303 |
|---|---|---|

310

| DISPLAY DEVICE 304 | INPUT DEVICE 305 | COMMUNICATION DEVICE 306 |
|---|---|---|

INFERENCE APPARATUS, LEARNING APPARATUS, INFERENCE METHOD, AND LEARNING METHOD

CROSS-REFERENCE TO RELATED APPLICATIONS

This application is based upon and claims the benefit of priority from Japanese Patent Application No. 2019-126591, filed on Jul. 8, 2019; the entire contents of which are incorporated herein by reference.

FIELD

Embodiments described herein relate generally to an inference apparatus, a learning apparatus, an inference method, and a learning method.

BACKGROUND

Technologies have conventionally been known to execute inference processing using a machine learning model on, for example, an edge device. Technologies have been desired that can dynamically adjust a load for the inference processing in accordance with a status of use of resources when the inference processing is performed on, for example, the edge device. In general, the load for the inference processing decreases with reduction in the size of the machine learning model. However, when the size of the machine learning model, such as a neural network, changes during the inference from that during learning, inference accuracy significantly decreases.

BRIEF DESCRIPTION OF THE DRAWINGS

FIG. 5 is a diagram illustrating an example of change processing by a changing unit according to the first embodiment;

DETAILED DESCRIPTION

An inference apparatus according to an embodiment of the present disclosure includes a memory and a hardware processor coupled to the memory. The hardware processor is configured to: acquire at least one control parameter of second machine learning model, the second machine learning model having a size smaller than a size of a first machine learning model input to the inference apparatus; change the first machine learning model to the second machine learning model based on the at least one control parameter; and perform inference in response to input data by using the second machine learning model.

The following describes embodiments of an inference apparatus, a learning apparatus, an inference method, and a learning method in detail with reference to the accompanying drawings.

First Embodiment

In a first embodiment, an exemplary case will be described, in which a multilayer neural network is used as a machine learning model. The machine learning model is not limited to the multilayer neural network, and may be another model, such as a support vector machine. The following describes a fully connected neural network. However, for example, a convolutional neural network may also be used. The first embodiment will be described assuming that a tensor of weight coefficients is a matrix (second-order tensor). In the case of the convolutional neural network, a fourth-order tensor of horizontal width×vertical width×input channels×output channels can be transformed into a matrix of, for example, (horizontal width×vertical width×input channels)×output channels. The following describes a case of directly acquiring a model size as a control parameter. The model size may be determined based on desired hardware performance, such as a power consumption or a memory capacity.

Example of Functional Configuration

Figure 1:
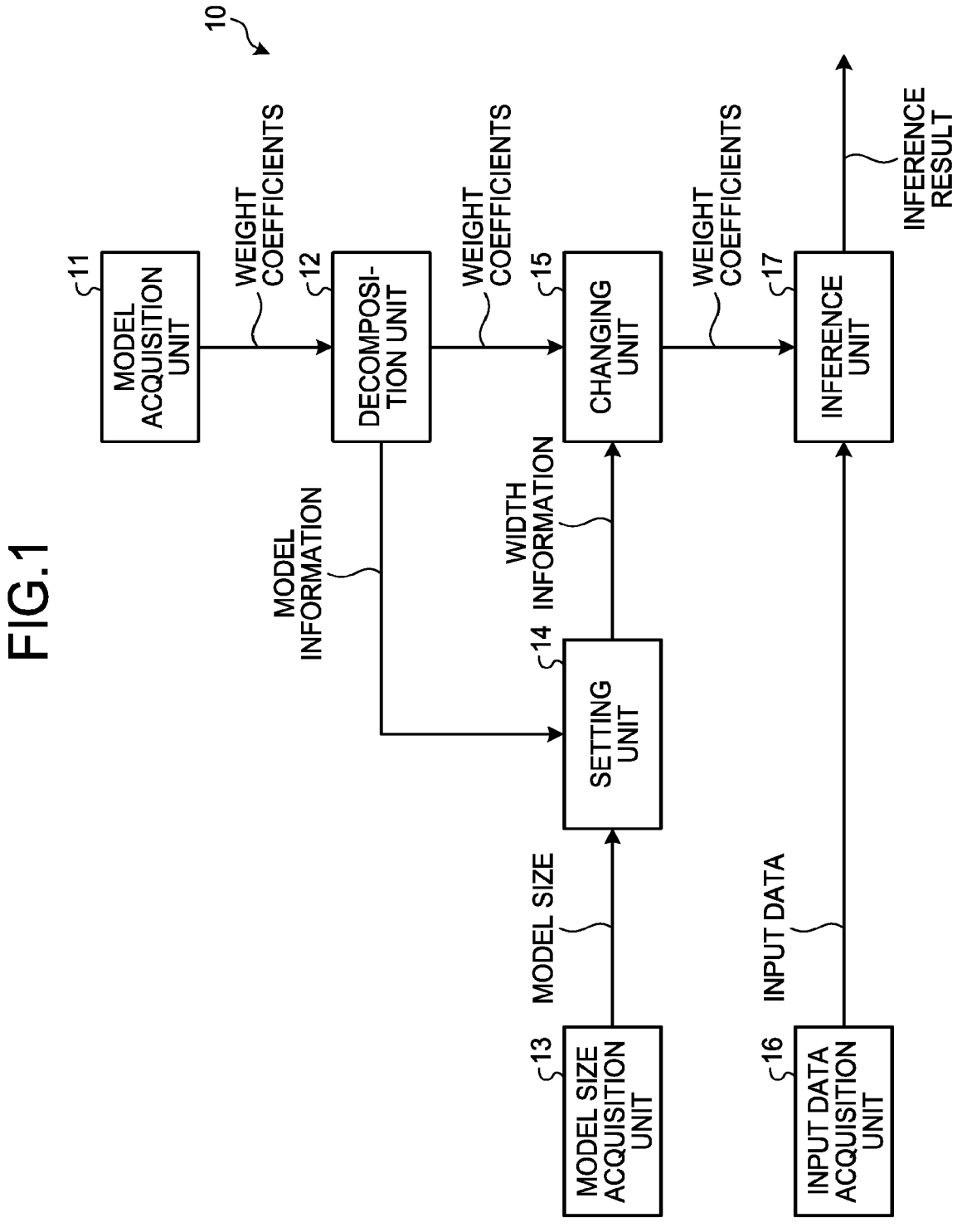
FIG. 1 is a diagram illustrating an example of a functional configuration of an inference apparatus according to a first embodiment.

FIG. 1 is a diagram illustrating an example of a functional configuration of an inference apparatus 10 according to the first embodiment. The inference apparatus 10 includes a model acquisition unit 11, a decomposition unit 12, a model size acquisition unit 13, a setting unit 14, a changing unit 15, an input data acquisition unit 16, and an inference unit 17.

The model acquisition unit 11 acquires the machine learning model. The model acquisition unit 11 acquires the machine learning model, for example, from the learning apparatus. The learning apparatus will be described in a second embodiment.

The decomposition unit 12 decomposes, by using a tensor decomposition method, the tensor of the weight coefficients of the machine learning model (first machine learning model) acquired by the model acquisition unit 11 into two or more tensors (decomposed tensors). In the first embodiment, the decomposition unit 12 decomposes a weight matrix W of the machine learning model acquired by the model acquisition unit 11.

Figure 2:
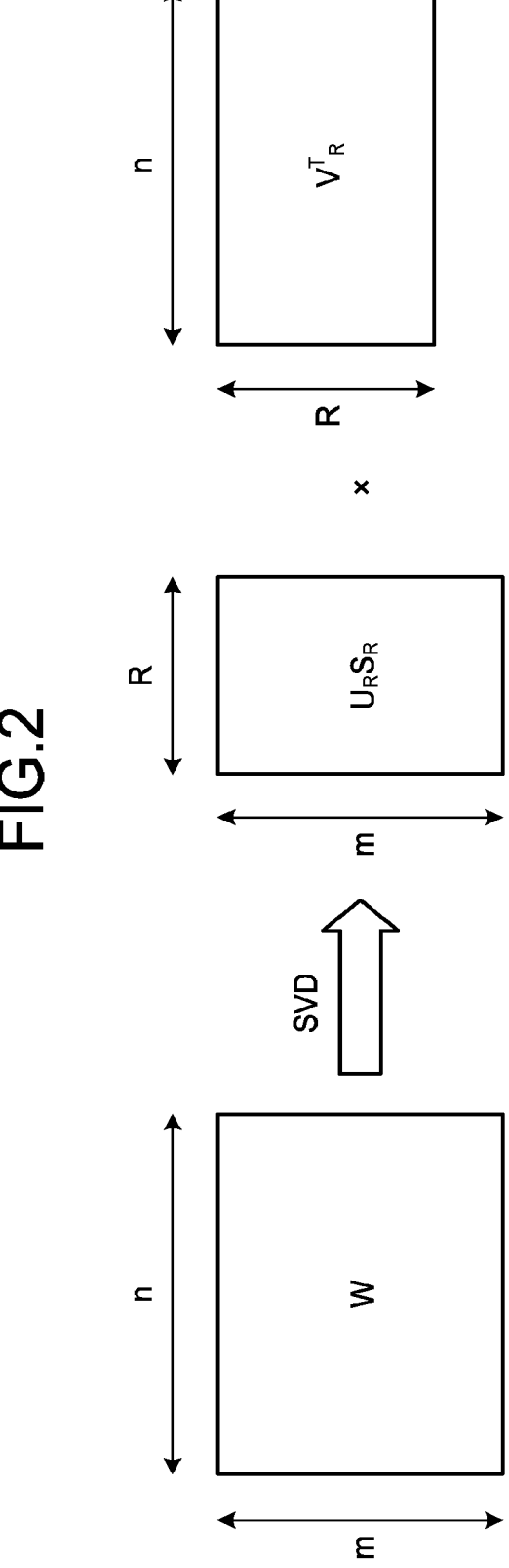
FIG. 2 is a diagram illustrating an example of decomposition processing by a decomposition unit according to the first embodiment.

FIG. 2 is a diagram illustrating an example of the decomposition processing by the decomposition unit 12 according to the first embodiment. The example of FIG. 2 represents a case of decomposing the weight matrix W having an m×n size into two matrices each having a width R. Each component of the weight matrix W represents a weight having a real value. In the decomposition method, the weight matrix W is decomposed as illustrated in FIG. 2 using, for example, a singular value decomposition (SVD) technique. The decomposition unit 12 may use another decomposition method to decompose the weight matrix W into three or more matrices.

The decomposition unit 12 determines R within a range of $1 \leq R \leq \min(m, n)$. Specifically, R is the number of basis vectors remaining after deleting basis vectors having lower contribution degrees from basis vectors (columns of US or rows of $V^T$). A contribution degree $\alpha_j$ of a j-th basis vector (where $j=1, \ldots, \min(m, n)$) is calculated based on, for example, a level of a singular value. In the first embodiment, the contribution degree $\alpha_j$ is calculated using Equation 1 below that normalizes the singular value with respect to the maximum value.

$$\alpha_j = \frac{\sigma_j}{\max_{i=1,\ldots,\min(m,n)} \sigma_i} \in [0, 1] \tag{1}$$

In Equation 1, $\sigma_j$ represents the singular value of the j-th basis vector (a diagonal component of a diagonal matrix S). A variance criterion, an information criterion, or a discrimination criterion may also be used as the contribution degree. The decomposition unit 12 supplies model information including the contribution degrees of the R basis vectors and the number of parameters to the setting unit 14. The number of parameters is a sum of a number mR of components (weight coefficients) of a weight matrix $U_R S_R$ and a number Rn of components of a weight matrix $V^T_R$. The decomposition unit 12 supplies the weight coefficients of the decomposed weight matrices (the weight coefficients of the weight matrix $U_R S_R$ and the weight coefficients of the weight matrix $V^T_R$) to the changing unit 15.

When the machine learning model has a plurality of weight matrices W, that is, for example, in a case where the neural network has a plurality of layers, the above-described decomposition processing may be executed on each of the weight matrices W. The decomposition unit 12 needs to execute the decomposition processing only once on the machine learning model received from the model acquisition unit 11.

Referring back to FIG. 1, after the model size acquisition unit 13 acquires the model size of the machine learning model, the model size acquisition unit 13 supplies the model size to the setting unit 14. The model size is a size of machine learning model (second machine learning model) to be generated by the changing unit 15. The model size is an example of at least one control parameter for controlling the hardware performance of the inference apparatus 10. In the first embodiment, an exemplary case will be described where the model size serves as a control parameter. However, the at least one control parameter is not limited to the model size. The at least one control parameter includes at least one of, for example, the model size, an amount of calculation, an inference accuracy, an inference speed, the power consumption, a memory capacity, and a memory bandwidth.

The setting unit 14 sets the width of the decomposed tensors of the tensor of the weight coefficients in accordance with the model size. In the first embodiment, each time the model size is received from the model size acquisition unit 13, the setting unit 14 sets the width r ($1 \leq r \leq R$) of $(U_r S_r) V^T_r$ as the width r of the weight matrix W, and supplies width information representing the width r of the weight matrix W to the changing unit 15.

Figure 3:
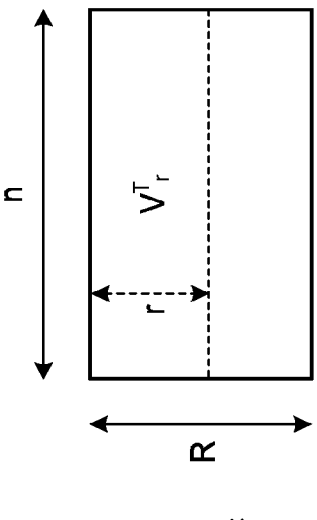
FIG. 3 is a diagram for explaining a width of a weight matrix according to the first embodiment.
Figure 3:
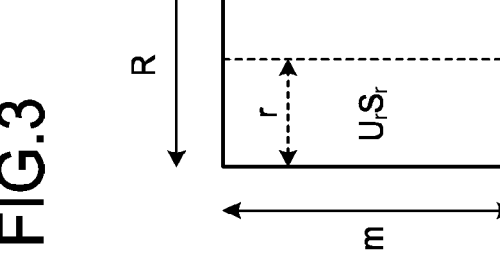
Figure 3:
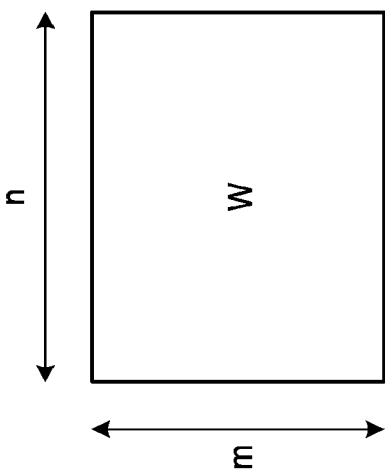

FIG. 3 is a diagram for explaining the width r of the weight matrix W according to the first embodiment. The width r of the weight matrix W is determined by the number of columns r of the decomposed weight matrix $U_R S_R$ (the number of rows r of the decomposed weight matrix $V^T_R$). The setting unit 14 selects r basis vectors ($1 \leq r \leq R$) from the R basis vectors to set the width of the decomposed tensors (a weight matrix $U_r S_r$ and a weight matrix $V^T_r$ in FIG. 3). Specifically, based on the model information received from the decomposition unit 12, the setting unit 14 increases, until reaching a target model size, the width r of the weight matrix W by adding the basis vectors in the order from a basis vector having a larger contribution degree $\alpha_j$. Alternatively, the setting unit 14 reduces, until reaching a target model size, the width r of the weight matrix W by deleting the basis vectors in the order from a basis vector having a smaller contribution degree $\alpha_j$.

In the case where the machine learning model has the multiple weight matrices W, the setting unit 14 may independently set the width r until each of the weight matrices W has the target size. In this case, the width r is uniform when the numbers of parameters of the weight matrices W are the same as one another. Alternatively, the setting unit 14 may arrange the contribution degrees of the basis vectors included in the weight matrices W in descending order or in ascending order, and then set the width r as described above. In this case, the width r of each of the weight matrices W including basis vectors having larger contribution degrees preferentially increases. Therefore, the width r is non-uniform even if the numbers of parameters of the weight matrices W are the same as one another.

Figure 4A:
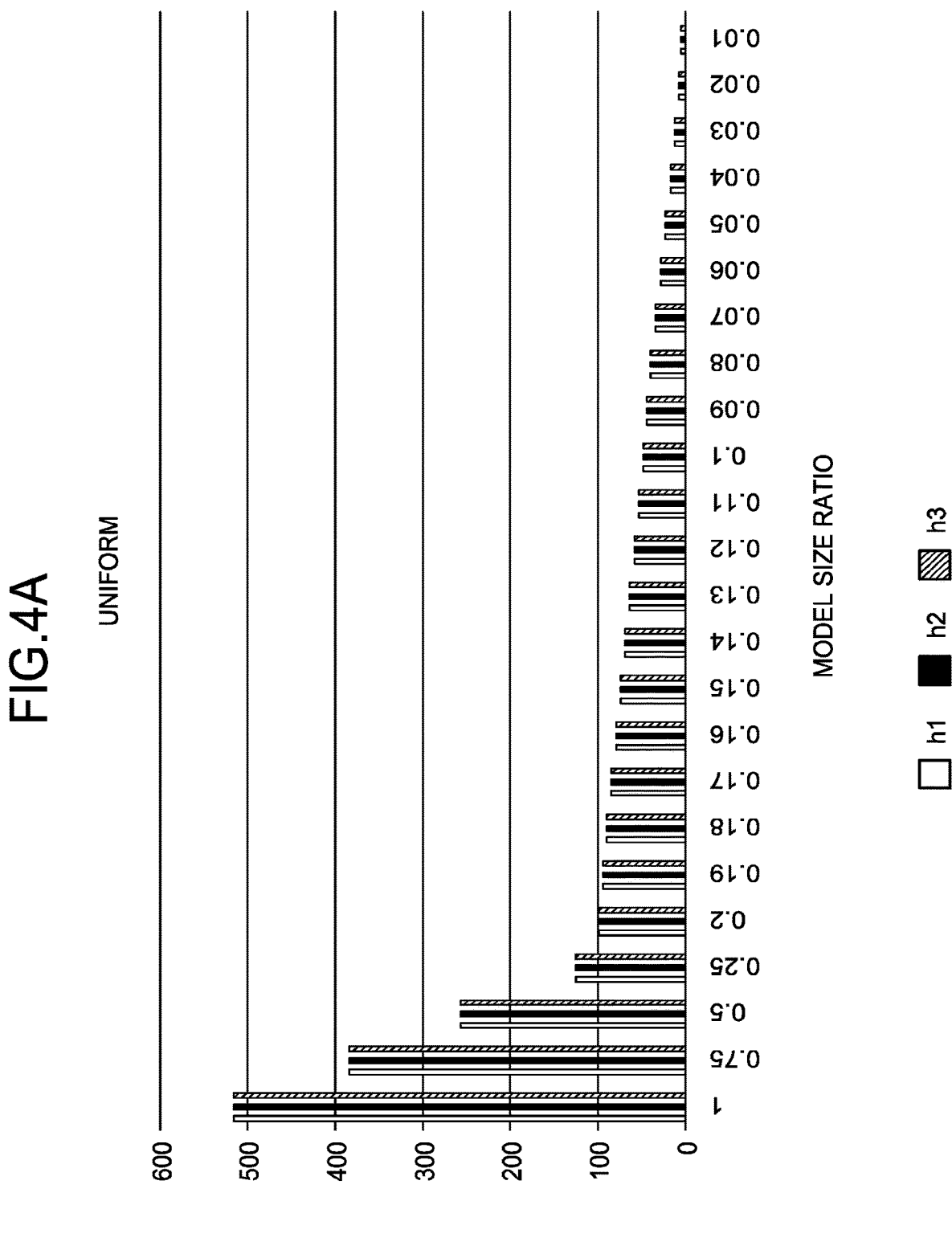
FIG. 4A is a diagram illustrating a setting example of a width r (in a case of uniform) according to the first embodiment.
Figure 4B:
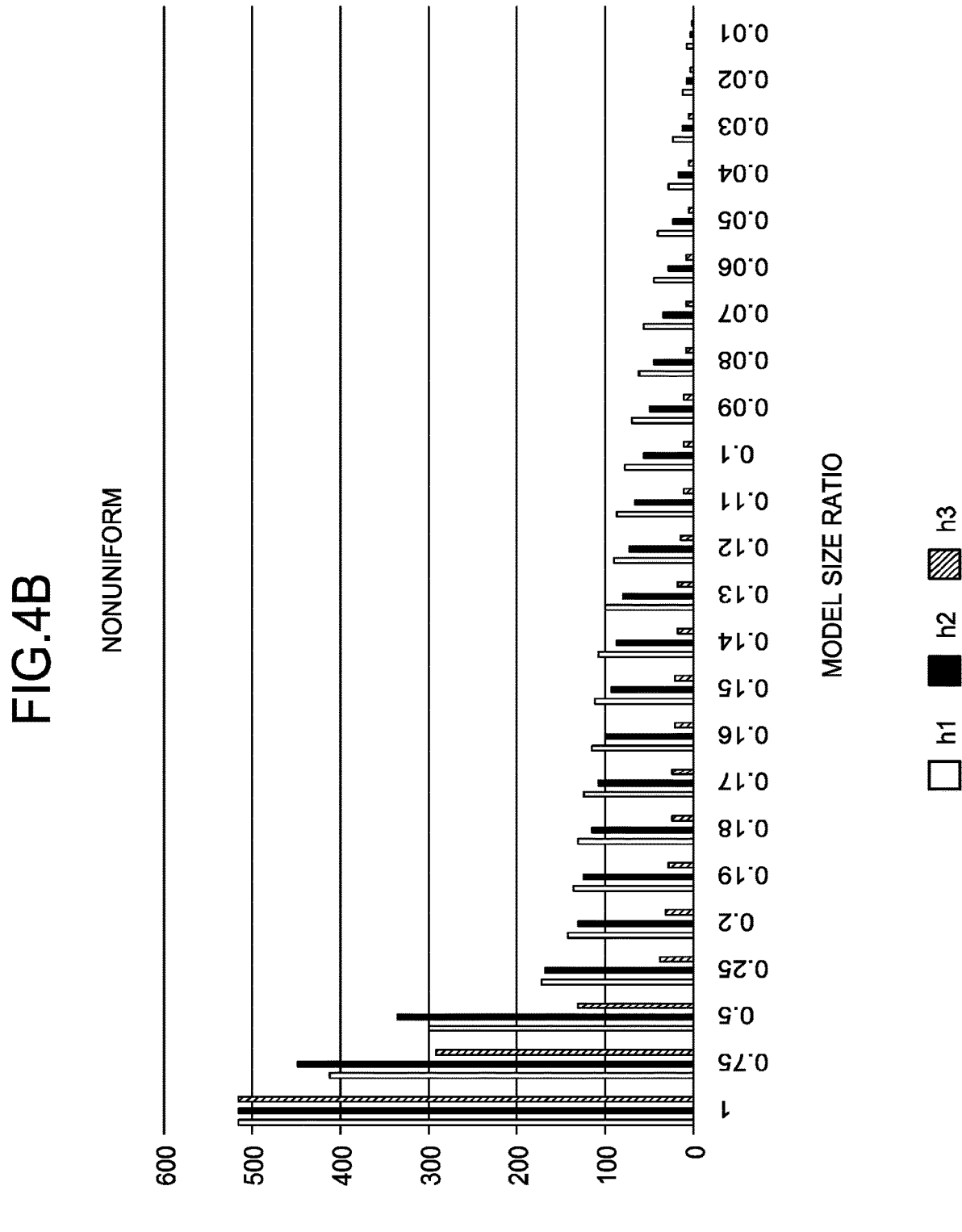
FIG. 4B is a diagram illustrating a setting example of the width r (in a case of non-uniform) according to the first embodiment.

FIG. 4A is a diagram illustrating a setting example of the width r (in a case of uniform) according to the first embodiment. FIG. 4B is a diagram illustrating a setting example of the width r (in a case of non-uniform) according to the first embodiment. The examples of FIGS. 4A and 4B illustrate cases of setting the width r of the neural network having three intermediate layers each having 512 nodes. Symbols h1 to h3 denote respective layers of the intermediate layers. As illustrated in FIG. 4B, in the case of the non-uniform way, layers having larger contribution degrees (layers corresponding to the weight matrices W including more basis vectors having larger contribution degrees) have the larger width r. A relation between the widths r of the weight matrices W and the model size may be tabulated and kept in the inference apparatus 10. While FIGS. 4A and 4B illustrate the cases of the neural network having the three intermediate layers, the number of the intermediate layers may be set to any value.

Referring back to FIG. 1, the changing unit 15 changes the first machine learning model to the second machine learning model in accordance with the at least one control parameter. Specifically, the changing unit 15 changes the machine learning model (first machine learning model) to the machine learning model (second machine learning model) represented by the two or more decomposed tensors each having the width set by the setting unit 14. In the first embodiment, each time the width information representing the width r ($1 \leq r \leq R$) is received from the setting unit 14, the changing unit 15 changes the width r of the weight matrix W and supplies the changed model (weight coefficients) to the inference unit 17. This operation can change the number of parameters (number of weight coefficients) of the weight matrix W within a range of $(m+n) \leq (m+n)r \leq (m+n)R$.

Figure 5:
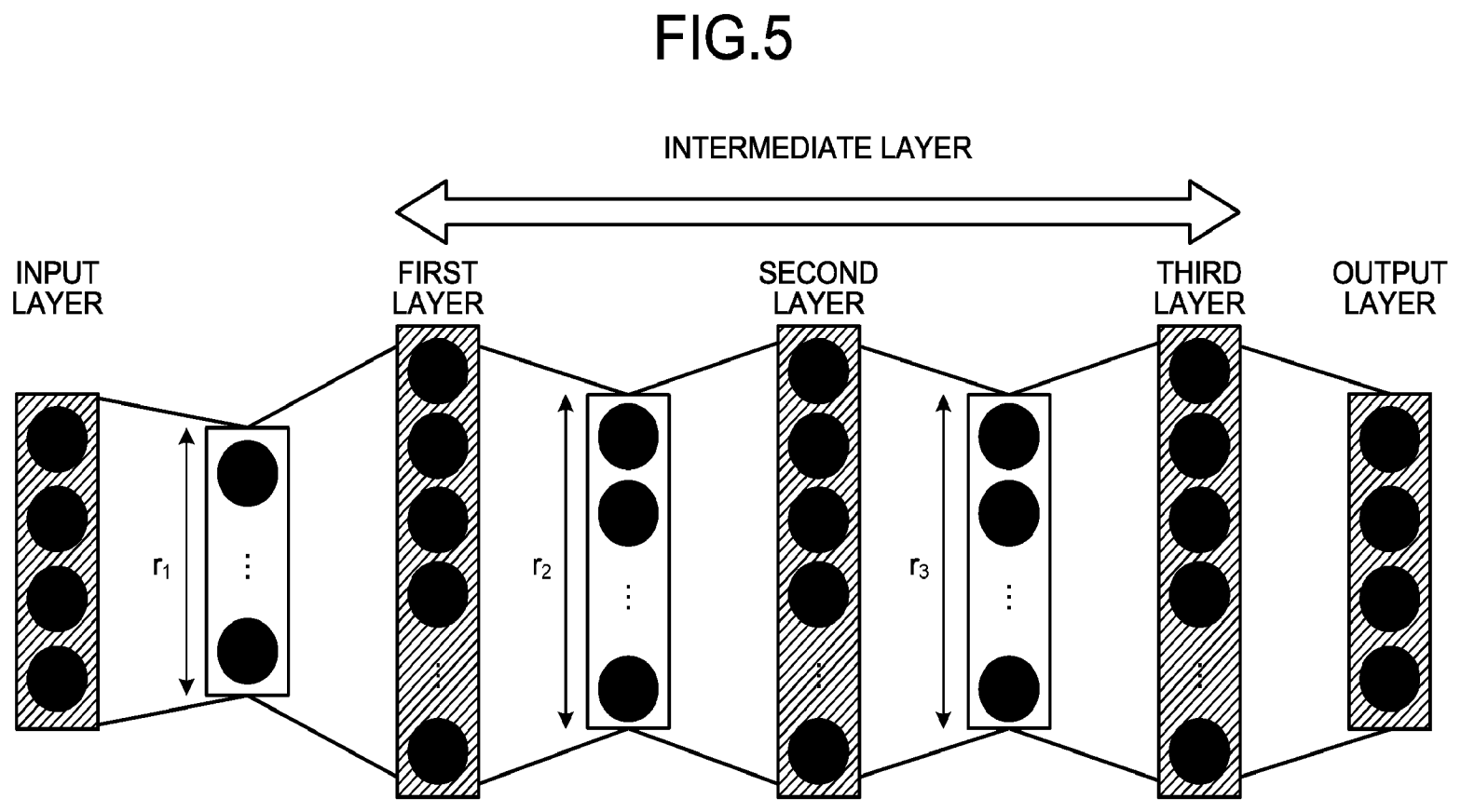

FIG. 5 is a diagram illustrating an example of the change processing by the changing unit 15 according to the first embodiment. The example of FIG. 5 represents a case of changing the widths in the neural network having the three intermediate layers. In this case, individual each weight matrix W connected to a first layer, a second layer, and a third layer is decomposed into the weight matrices US and $V^T$ by the decomposition processing described above. The changing unit 15 changes the machine learning model by changing the weight matrix W connected to the first layer to the weight matrices US and $V^T$ having a width r1, changing the weight matrix W connected to the second layer to the weight matrices US and $V^T$ having a width r2, and changing the weight matrix W connected to the third layer to the weight matrices US and $V^T$ having a width r3.

When the model includes normalization processing, the changing unit 15 corrects an influence of the width change by changing parameters of the normalization processing based on the width r ($1 \leq r \leq R$). For example, when the machine learning model includes a normalization layer for executing the normalization processing, the changing unit 15 corrects the parameters used in the normalization processing according to the width set by the setting unit 14. In the first embodiment, a case will be described where the parameters of means and variances are corrected when the neural network has a batch normalization layer.

The batch normalization layer normalizes a vector y on which an input x has been transformed through the weight matrix W, as given below.

$$y = W^T x \qquad (2)$$

$$\tilde{y} = \Gamma Z^{-\frac{1}{2}}(y - \mu) + \beta \qquad (3)$$

$$\Gamma = \mathrm{diag}(\gamma_1, \gamma_2, \ldots, \gamma_n) \qquad (4)$$

$$Z = \mathrm{diag}(\sigma_1^2, \sigma_2^2, \ldots, \sigma_n^2) \qquad (5)$$

In the above equations, $\Gamma$ and $\beta$ denote a scale and bias parameters determined by learning, and $\mu$ and Z denote the parameters of the mean and the variance determined by the learning. The changing unit 15 calculates, by using the width r, corrected values $\mu_r$ and $Z_r$ of $\mu$ and Z, as given below.

$$\mu_r = (V_r V_r^T)\mu \qquad (6)$$

$$\overline{\sum}_r = (V_r V_r^T)\overline{\sum}(V_r V_r^T) \qquad (7)$$

$$Z_r = \mathrm{diag}\left(\sum_r\right) \qquad (8)$$

In the above equations, $\Sigma$ denotes a covariance matrix of y calculated using a learning sample. The symbol $Z_r$ denotes a diagonal matrix obtained by extracting only diagonal components of $\Sigma r$.

As described above, when carrying out the inference by the neural network, the decomposition unit 12 of the inference apparatus 10 according to the first embodiment divides, by using the matrix decomposition method, the matrix W of the weight coefficients of the machine learning model into a plurality of matrices. The changing unit deforms the matrices based on the width r of the matrices specified during the inference. When the neural network has the normalization layer, the parameters of the normalization layer are changed based on the width r specified during the inference. According to the first embodiment, controlling the width r can change a size of the machine learning model to an arbitrary size while keeping the inference accuracy as much as possible.

Referring back to FIG. 1, the input data acquisition unit 16 acquires input data such as image data.

Each time the input data is received from the input data acquisition unit 16, the inference unit 17 executes inference processing, and outputs a result of the processing. The inference processing herein refers to forward propagation of the neural network. The inference unit 17 continues to use the same machine learning model in response to the input unless a changed machine learning model (weight coefficients) is received from the changing unit 15.

As describe above, the decomposition unit 12 of the inference apparatus 10 according to the first embodiment decomposes, by using the tensor decomposition method, the tensor of the weight coefficients (in the first embodiment, the weight matrix W) of the first machine learning model into the two or more decomposed tensors. The model size acquisition unit 13 acquires the model size of the machine learning model. The setting unit 14 sets the width of the decomposed tensors in accordance with the model size. The changing unit 15 changes the first machine learning model to the second machine learning model represented by the two or more decomposed tensors each having the width set by the setting unit 14. The inference unit 17 performs the inference in response to the input data by using the second machine learning model.

Thus, the inference apparatus 10 according to the first embodiment can change the size of the machine learning model to an arbitrary size while restraining the inference accuracy from decreasing.

Second Embodiment

The following describes a second embodiment. In the second embodiment, the same description as that of the first embodiment will not be repeated. In the second embodiment, an exemplary case will be described where the multilayer neural network is used as the machine learning model. The machine learning model is not limited to the multilayer neural network, and may be another model, such as the support vector machine. The description will be made assuming that the tensor of the weight coefficients is a matrix (second-order tensor). The following describes a case of using the model size as a control parameter. The model size may be determined based on the desired hardware performance, such as the power consumption or the memory capacity.

Example of Device Configuration

Figure 6:
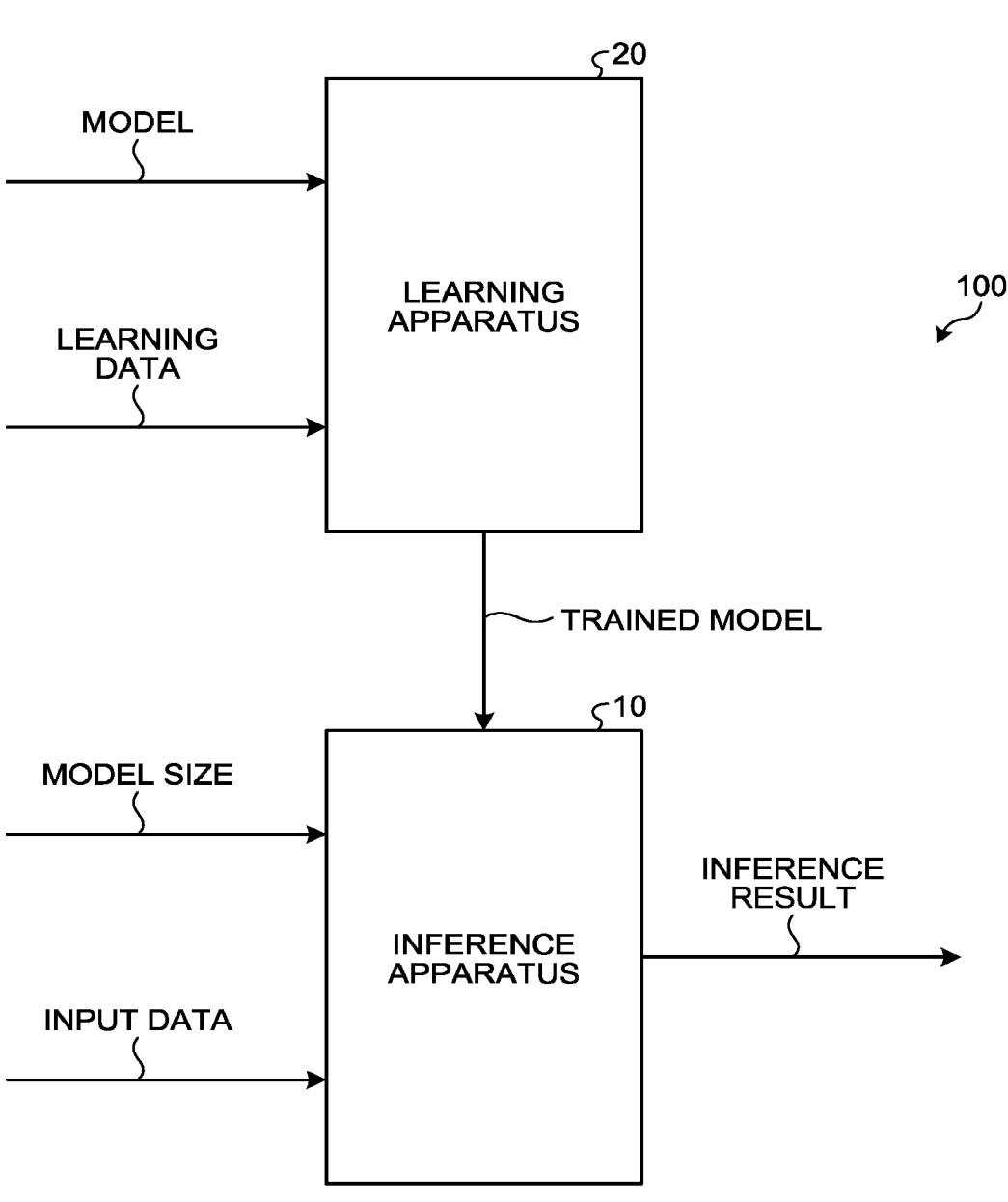
FIG. 6 is a diagram illustrating an example of a device configuration of an inference system according to a second embodiment.

FIG. 6 is a diagram illustrating an example of a device configuration of an inference system 100 according to the second embodiment. The inference system 100 according to the second embodiment includes the inference apparatus 10 and a learning apparatus 20. The description of the inference apparatus 10 is the same as that in the foregoing first embodiment, and thus, will not be repeated. The learning apparatus 20 applies machine learning to learn a model by using learning data, and supplies the trained model to the inference apparatus 10. While the second embodiment will be described as the inference system 100 including the inference apparatus 10 and the learning apparatus 20, the system may be constituted by only the learning apparatus 20.

Example of Functional Configuration

Figure 7:
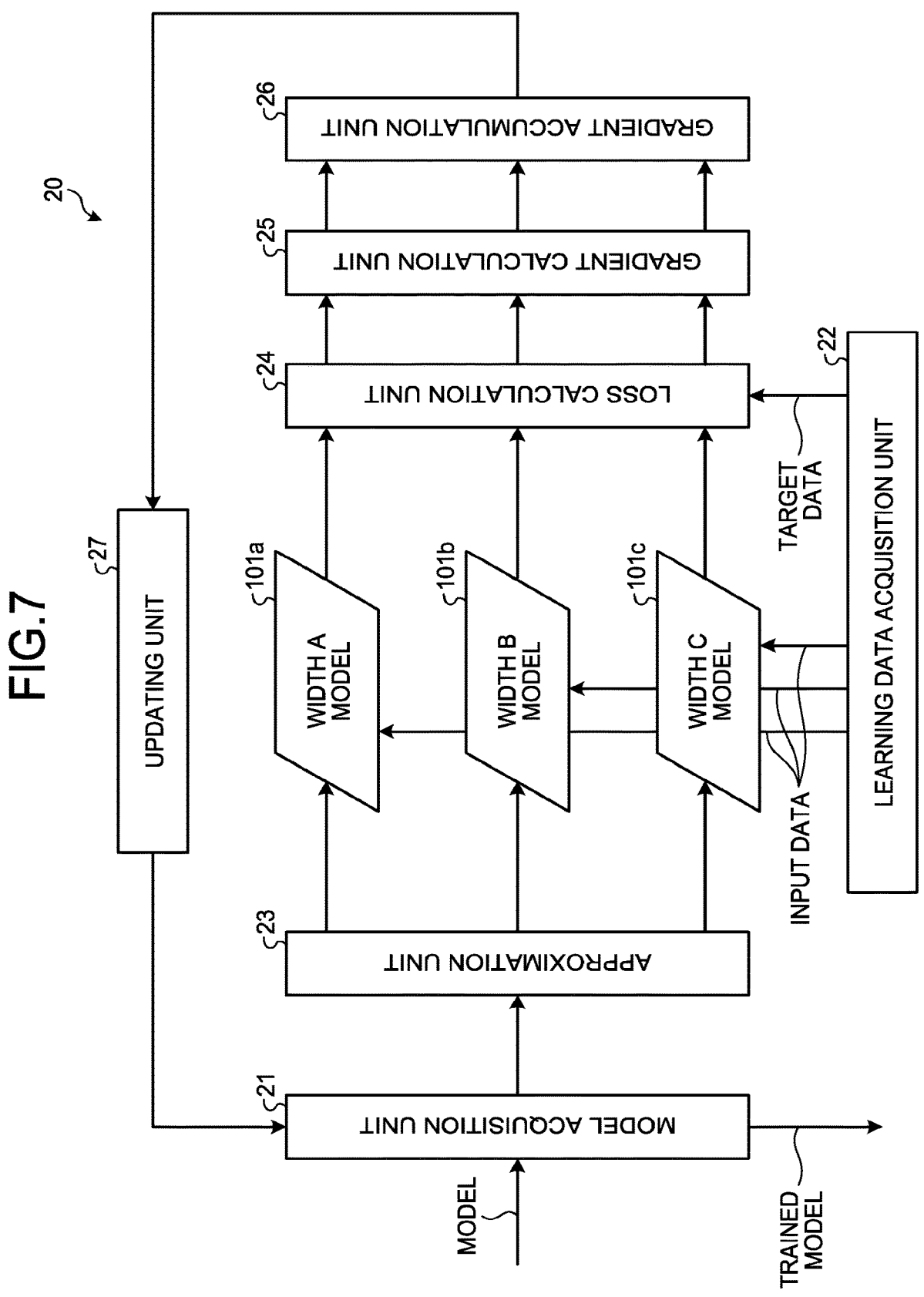
FIG. 7 is a diagram illustrating an example of a functional configuration of a learning apparatus according to the second embodiment.

FIG. 7 is a diagram illustrating an example of a functional configuration of the learning apparatus 20 according to the second embodiment. The learning apparatus 20 according to the second embodiment includes a model acquisition unit 21, a learning data acquisition unit 22, an approximation unit 23, a loss calculation unit 24, a gradient calculation unit 25, a gradient accumulation unit 26, and an updating unit 27.

At the start of the learning, the model acquisition unit 21 externally receives a model and initializes the model. During the learning, the model acquisition unit 21 receives the model updated at each step. At the end of the learning, the model acquisition unit 21 supplies the trained model to the inference apparatus 10.

The learning data acquisition unit 22 externally receives the learning data at the start of the learning. The learning data includes the input data and target data for the model. The target data represents output data (a correct answer label) of the model corresponding to the input data. At each step during the learning, the learning data acquisition unit 22 supplies all or some of the input data to width A to C models 101a to 101c, and supplies all or some of the target data to the loss calculation unit 24.

The approximation unit 23 approximates the weight matrix W having a size of m×n to a weight matrix $W_r$ of a lower rank. The above-mentioned singular value decomposition is used as an approximation method such that $W_r = U_r S_r V^T_r$. Examples of a value used as an order r (the width r described above) include a value determined in advance within a range of $1 \leq R \leq \min(m, n)$, a value calculated using, for example, a cumulative contribution rate, and a randomly selected value.

When the model includes the multiple weight matrices W, the approximation unit 23 may approximate all the weight matrices W, or may approximate part of the weight matrices W. In the selection of the r basis vectors included in the weight matrix $W_r$, the r basis vectors may be selected in descending order of the contribution degree determined based on, for example, the singular value, in the same way as in the case of the setting unit 14 according to the first embodiment. The approximation unit 23 generates, from a single model, a plurality of approximate models having different ranks r by using the approximation method described above. The number of the approximate models is not limited to three, and may be any number.

In the example of FIG. 7, the approximation unit 23 generates the width A to C models 101a to 101c as the approximate models. The width A model 101a is a model represented by a weight matrix $W_A$ having the width r=A. The width B model 101b is a model represented by a weight matrix $W_B$ having the width r=B. The width C model 101c is a model represented by a weight matrix $W_C$ having the width r=C. The approximate models share all parameters except the weight matrices $W_A$ to $W_C$ to execute processing.

The loss calculation unit 24 calculates a loss function $L_i(D, W_{ri}, \Theta)$ (i=1, . . . , M) of each of the approximate models of rank ri (i=1, . . . , M). In this function, M denotes the number of the models, and, for example, M=3 when the three models illustrated in FIG. 7 are used. The symbol D denotes the learning data. The symbol $L_i$ denotes the loss function, and, for example, a cross-entropy function is used as the loss function in, for example, classification problems. The symbol $W_{ri}$ denotes a weight matrix for the approximate model of the rank ri. The symbol $\Theta$ denotes all learnable parameters except $W_{ri}$. A regularization function, such as that for $L_2$ regularization of the weights, may be added to the loss function.

The gradient calculation unit 25 uses Equations 9 and 10 below to differentiate the loss function to calculate gradients for each of the approximate models.

$$\nabla^{(i)}_W = \frac{\partial \mathcal{L}_i(D, W_{r_i}, \Theta)}{\partial W} \tag{9}$$

$$\nabla^{(i)}_\Theta = \frac{\partial \mathcal{L}_i(D, W_{r_i}, \Theta)}{\partial \Theta} \tag{10}$$

Note that the differential with respect to the weight matrix W given by Equation (9) is calculated not with respect to the weight matrix $W_{ri}$ for each of the approximate models, but with respect to the weight matrix W before the approximation. Specifically, for example, the differential is calculated by Equation 11 or 12 below.

$$\frac{\partial \mathcal{L}_i(D, W_{r_i}, \Theta)}{\partial W} = U_{r_i} U^T_{r_i} \frac{\partial \mathcal{L}_i(D, W_{r_i})}{\partial W_{r_i}} \tag{11}$$

$$\frac{\partial \mathcal{L}_i(D, W_{r_i}, \Theta)}{\partial W} = \frac{\partial \mathcal{L}_i(D, W_{r_i})}{\partial W_{r_i}} V_{r_i} V^T_{r_i} \tag{12}$$

In the above equations, $U_{ri}$ and $V_{ri}$ denote matrices obtained when the model is approximated to have the rank ri.

The gradient accumulation unit 26 accumulates the gradients of the approximate models, and supplies the result to the updating unit 27. Specifically, the gradient accumulation unit 26 uses Equations 13 and 14 below to accumulate the gradients of the approximate models.

$$\nabla_W = \sum_{i=1}^{M} \alpha_i \nabla^{(i)}_W \tag{13}$$

$$\nabla_\Theta = \sum_{i=1}^{M} \beta_i \nabla^{(i)}_\Theta \tag{14}$$

In the above equations, $\alpha_i$ and $\beta_i$ (i=1, . . . , M) denote coefficients representing weights for the respective losses. Examples of $\alpha_i$ and $\beta_i$ include values determined in advance, values calculated according to the rank (width r) of each of the models, and values determined by progress of the learning. When the regularization function, such as that for the $L_2$ regularization of the weights, is added to the loss function, a gradient of the regularization function is added to Equations 13 and 14 above.

The updating unit 27 simultaneously minimize the loss functions of the plural approximate models by using the gradients accumulated by the gradient accumulation unit 26, thereby updating the parameters of the model to be trained. A stochastic gradient method, such as momentum stochastic gradient descent (SGD) and Adam, may be used as an update method.

As described above, the inference system 100 according to the second embodiment includes the inference apparatus 10 and the learning apparatus 20. The inference apparatus controls the width r described above to change the machine learning model to the approximate models each having an arbitrary model size (refer to FIG. 3) while keeping the inference accuracy as much as possible.

In the learning apparatus 20, the model acquisition unit 21 acquires the model to be trained. The approximation unit 23 decomposes the tensor of the weight coefficients (in the second embodiment, the weight matrix W) into the two or more decomposed tensors obtained by the tensor decomposition method, and approximates the model to the approximate models (in the second embodiment, the width A to C models 101a to 101c) represented by the decomposed tensors each having the different width. The learning data acquisition unit 22 acquires the learning data including the input data and the target data, and supplies the input data to the approximate models. The loss calculation unit 24 uses the target data and the output data output from the approximate models in response to the input data to calculate the loss functions of the respective approximate models. The gradient calculation unit 25 calculates the gradients of the respective loss functions. The accumulation unit 26 accumulates the gradients. The updating unit 27 updates the parameters of the model to be trained such that the loss functions of the approximate models are minimized based on the accumulated gradients.

In other words, on the assumption that the inference apparatus 10 executes the approximate models having the ranks (widths r) of the plural matrices, the learning apparatus 20 learns the model while calculating the gradients of the loss functions of the approximate models having the widths r. This operation can change the size of the machine learning model to an arbitrary size while keeping the inference accuracy as much as possible.

Figure 8:
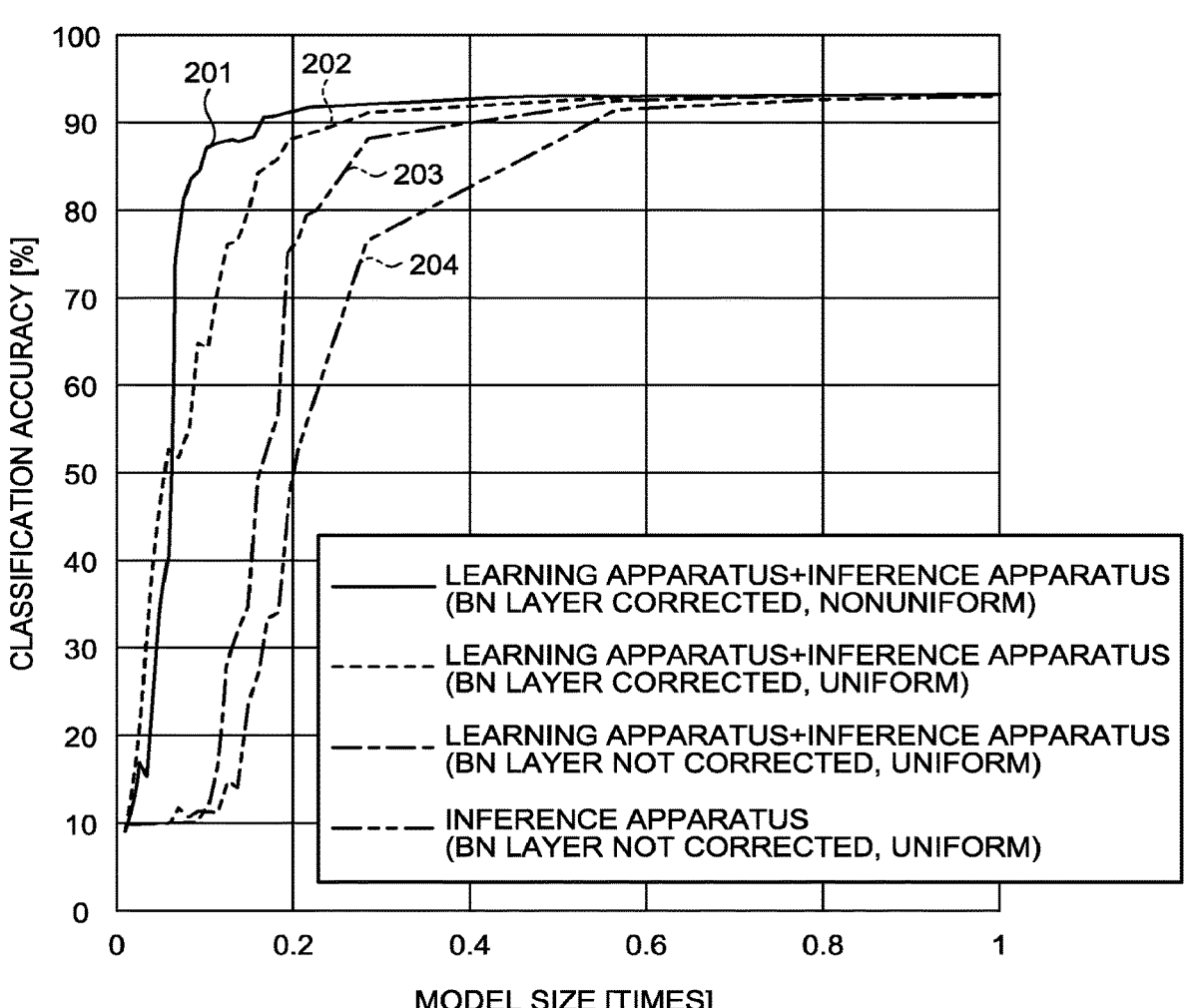
FIG. 8 is a diagram for explaining effects of the first and second embodiments.

FIG. 8 is a diagram for explaining effects of the first and second embodiments. The example of FIG. 8 represents a case where the convolutional neural network having 15 layers is used for a dataset of general object recognition of 10 classes (CIFAR-10). The vertical axis represents classification accuracy. The horizontal axis represents the model size.

Graphs 201 to 203 represent results obtained by the inference system 100 including the inference apparatus 10 and the learning apparatus 20. The graph 201 represents a case where parameters of a batch normalization layer are corrected and the width r is non-uniformly set (in the order of the singular values) in the inference apparatus 10. The graph 202 represents a case where the parameters of the batch normalization layer are corrected and the width r is uniformly set in the inference apparatus 10. The graph 203 represents a case where the parameters of the batch normalization layer are not corrected and the width r is uniformly set in the inference apparatus 10.

A graph 204 represents a result obtained by the inference apparatus 10. The graph 204 represents a case where the parameters of the batch normalization layer are not corrected and the width r is uniformly set.

Third Embodiment

The following describes a third embodiment. In the third embodiment, the same description as that of the first embodiment will not be repeated. In the third embodiment, as a specific example, a case will be described where an automated driving system uses the inference apparatus 10. The automated driving system is a system that assists driving of a vehicle. For example, the automated driving system recognizes an image captured by a camera mounted on the vehicle, and executes driving control of the vehicle based on the recognition result. The automated driving system recognizes, for example, pedestrians, vehicles, traffic lights, signs, and lanes, and executes the driving control of the vehicle.

Example of Configuration

Figures 9, 10:
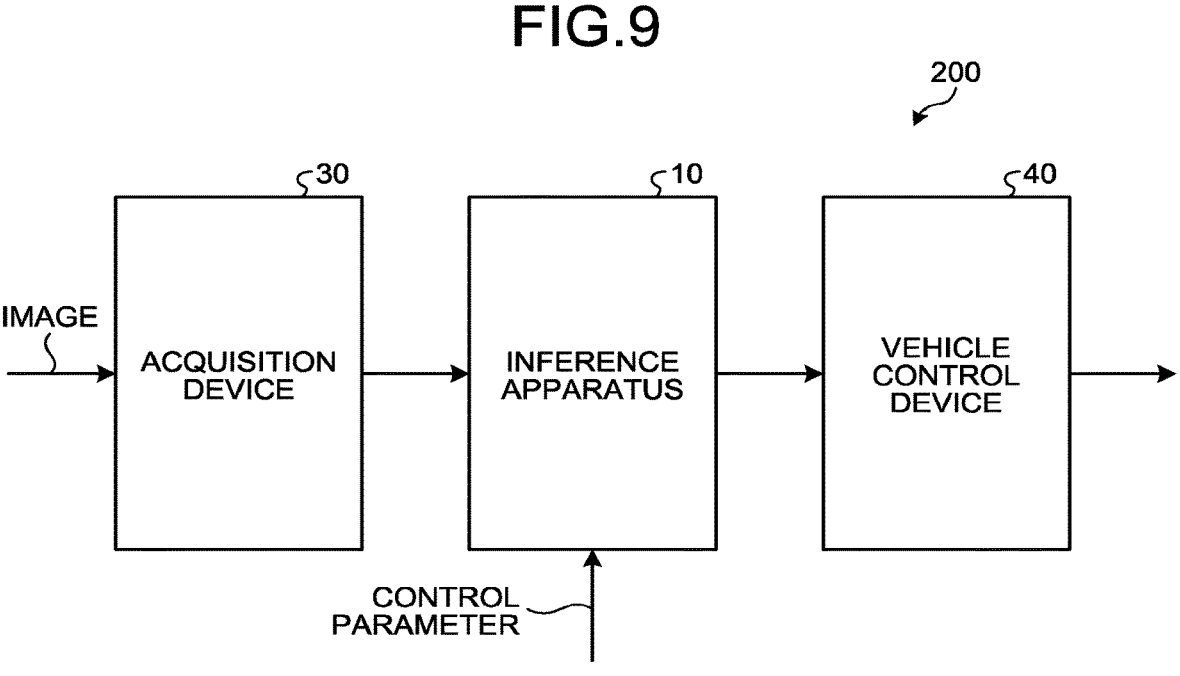
FIG. 9 is a diagram illustrating an example of a configuration of an automated driving system according to a third embodiment.
FIG. 10 is a diagram illustrating an example of a hardware configuration of the inference apparatus and the learning apparatus according to the first to third embodiments.

FIG. 9 is a diagram illustrating an example of a configuration of an automated driving system 200 according to the third embodiment. The automated driving system 200 according to the third embodiment includes the inference apparatus 10, an acquisition device 30, and a vehicle control device 40.

The acquisition device 30 acquires the image captured by the camera mounted on the vehicle. The acquisition device 30 supplies the acquired image to the inference apparatus 10.

The inference apparatus 10 acquires at least one control parameter. Examples of the at least one control parameter includes a status of use of computational resources and an order of priority of a plurality of processing devices provided on the vehicle. For example, when a plurality of processes are executed by the automated driving system 200, the inference apparatus 10 sets a larger model size for an inference process having a higher order of priority. The inference apparatus 10 recognizes objects, such as pedestrians, vehicles, traffic lights, signs, and lanes, from the captured image. The inference apparatus has been optimized by, for example, the learning apparatus 20 according to the second embodiment. The automated driving system 200 may include the learning apparatus 20.

The vehicle control device 40 executes the control processing based on the recognition result received from the inference apparatus 10. For example, the vehicle control device 40 controls the vehicle or provides a warning to a driver.

The automated driving system 200 according to the third embodiment uses a model whose size can be changed to an arbitrary size while keeping the inference accuracy as much as possible. Thus, with the automated driving system 200 according to the third embodiment, the inference apparatus 10 can change the model size depending on the order of priority of the inference process in the automated driving system 200, thereby reducing the power consumption of the automated driving system 200.

The inference apparatus 10 and the learning apparatus 20 according to the foregoing first and second embodiments can be applied not only to the automated driving system 200, but also to other applications.

The inference apparatus 10 can be applied to an infrastructure maintenance system. The inference apparatus 10 applied to the infrastructure maintenance system is used for, for example, planning a flight path or detecting a degree of deterioration of a railroad bridge or some other bridge based on an image captured by a camera mounted on a drone or the like.

The inference apparatus 10 can also be applied, for example, to a robot control system. The inference apparatus 10 applied to the robot control system controls operations of a robot based on an image captured by a sensor or a camera provided in the robot control system.

The inference apparatus 10 can also be applied, for example, to a point-of-sale (POS) signage system. The inference apparatus 10 applied to the POS signage system makes, for example, an estimation of an attribute of a customer and a recommendation based on an image captured by a camera provided in the POS signage system.

The inference apparatus 10 can also be applied, for example, to a terminal, such as a smartphone. The inference apparatus 10 applied to the terminal, such as the smartphone recognizes an image captured by a camera mounted thereon, recognizes a text entered through a screen, and recognizes voice received through a microphone.

In the same way as in the case of the automated driving system 200 according to the third embodiment, the inference apparatus 10 applied to the above-described systems (the infrastructure maintenance system, the robot control system, the POS signage system, the smartphone, and the like) can reduce the power consumption by changing the model size according to the order of priority of the inference process of the inference apparatus 10 in the system.

The inference apparatus 10 can also be applied to a monitoring system. The inference apparatus 10 applied to the monitoring system monitors a surrounding situation based on an image captured by a camera installed, for example, in an elevator, on a railway vehicle, in a factory, at an illumination light, or on a street, and issues a notification when an abnormality is detected. The inference apparatus 10 applied to the monitoring system at any of those places can change the model size according to the time zone and the congestion state to reduce the power consumption.

Finally, the following describes an example of a hardware configuration of the inference apparatus 10 and the learning apparatus 20 according to the first to third embodiments.

Example of Hardware Configuration

FIG. 10 is a diagram illustrating the example of the hardware configuration of the inference apparatus 10 and the learning apparatus 20 according to the first to third embodiments.

The inference apparatus 10 includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected together over a bus 310.

The control device 301 is a hardware processor configured to execute a computer program that is read from the auxiliary storage device 303 and loaded on the main storage device 302. The main storage device 302 is a memory including, for example, a read-only memory (ROM) and a random access memory (RAM). The auxiliary storage device 303 is, for example, a hard disk drive (HDD), a solid-state drive (SSD), or a memory card.

The display device 304 displays display information. The display device 304 is, for example, a liquid crystal display. The input device 305 is an interface for operating a computer. The input device 305 is, for example, a keyboard and a mouse. When the computer is a smart device, such as a smartphone or a tablet computer, the display device 304 and the input device 305 are, for example, a touchscreen panel. The communication device 306 is an interface for communicating with other devices.

The computer program to be executed on the computer is provided as a computer program product by being recorded as a file in an installable format or an executable format on a computer-readable storage medium, such as a compact disc read-only memory (CD-ROM), a memory card, a compact disc-recordable (CD-R), or a digital versatile disc (DVD).

The computer program to be executed on the computer may be provided by being stored on a computer connected to a network, such as the Internet, and downloaded through the network. The computer program to be executed on the computer may also be provided through a network, such as the Internet, without being downloaded.

The computer program to be executed on the computer may also be provided by being incorporated in advance in a ROM or the like.

The computer program to be executed on the computer has a modular configuration including functional blocks implementable also by the computer program among the functional components (functional blocks) of the inference apparatus 10 described above. As actual hardware, the control device 301 reads the computer program from the storage medium and executes the computer program to load the above-described functional blocks in the main storage device 302. In other words, the above-described functional blocks are generated in the main storage device 302.

Part of or all the above-described functional blocks may be implemented by hardware, such as an integrated circuit (IC), without being implemented by software.

When two or more processors are used for implementing the functions, each of the processors may implement one of the functions, or two or more of the functions.

The inference apparatus 10 may be implemented in an arbitrary mode of operation of the computer. For example, the inference apparatus 10 may be implemented by one computer. The inference apparatus 10 may be operated as, for example, a cloud system on a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An inference apparatus comprising:
   a memory; and
   a hardware processor coupled to the memory and configured to:
   acquire at least one control parameter of second machine learning model, the second machine learning model having a size smaller than a size of a first machine learning model input to the inference apparatus;
   decompose, by using a tensor decomposition method, a tensor of weight coefficients of the first machine learning model into two or more decomposed tensors;
   set a width of each of the decomposed tensors and set sizes of the second machine learning model in accordance with the at least one control parameter;
   change the first machine learning model to the second machine learning model represented by the two or more decomposed tensors each having a set size, and
   perform inference in response to input data by using the second machine learning model, wherein
   the tensor of the weight coefficients is a matrix of the weight coefficients,
   the decomposed tensors are two or more matrices each constituted by R basis vectors, wherein R is an integer value of a number of basis vectors,
   the hardware processor sets the width of each decomposed tensor by selecting r basis vectors ($r \leq R$) from the R basis vectors, wherein r is an integer value of a number of basis vectors, and
   the hardware processor changes the first machine learning model to the second machine learning model represented by the two or more decomposed tensors each having the set width.

2. The apparatus according to claim 1, wherein
   the at least one control parameter is parameters to control hardware performance of the inference apparatus, and

the at least one control parameter includes at least one of a model size, an amount of calculation, an inference accuracy, an inference speed, a power consumption, a memory capacity, and a memory bandwidth.

3. The apparatus according to claim 1, wherein the hardware processor is further configured to select the r basis vectors in descending order of contribution degrees of the basis vectors.

4. The apparatus according to claim 1, wherein the hardware processor is further configured to:

decompose the matrix of the weight coefficients based on singular value decomposition of the matrix of the weight coefficients; and set the width of each of the decomposed tensors by selecting the r basis vectors in descending order of the contribution degrees determined based on singular values.

5. The apparatus according to claim 1, wherein, when the first machine learning model includes a normalization layer in which normalization processing is executed, the hardware processor is further configured to correct parameters to be used in the normalization processing based on the set width.

6. An inference method implemented by a computer, the method comprising:

acquiring at least one control parameter of second machine learning model, the second machine learning model having a size smaller than a size of a first machine learning model input to the computer;

decomposing, by using a tensor decomposition method, a tensor of weight coefficients of the first machine learning model into two or more decomposed tensors;

setting a width of each of the decomposed tensors and setting sizes of the second machine learning model in accordance with the at least one control parameter;

changing the first machine learning model to the second machine learning model represented by the two or more decomposed tensors each having a set size; and performing inference in response to input data by using the second machine learning model, wherein the tensor of the weight coefficients is a matrix of the weight coefficients, the decomposed tensors are two or more matrices each constituted by R basis vectors, wherein R is an integer value of a number of basis vectors, the width of each decomposed tensor is set by selecting r basis vectors ($r \leq R$) from the R basis vectors, wherein r is an integer value of a number of basis vectors, and the changing includes changing the first machine learning model to the second machine learning model represented by the two or more decomposed tensors each having the set width.

* * * * *